April 9, 1929.  C. H. DIERKSMIER  1,708,755
ROTARY ANTISKID CHAIN FOR VEHICLE WHEELS
Filed May 9, 1927    2 Sheets-Sheet 1

WITNESSES

INVENTOR
C. H. Dierksmier
BY
ATTORNEY

April 9, 1929.     C. H. DIERKSMIER     1,708,755
ROTARY ANTISKID CHAIN FOR VEHICLE WHEELS
Filed May 9, 1927     2 Sheets-Sheet 2
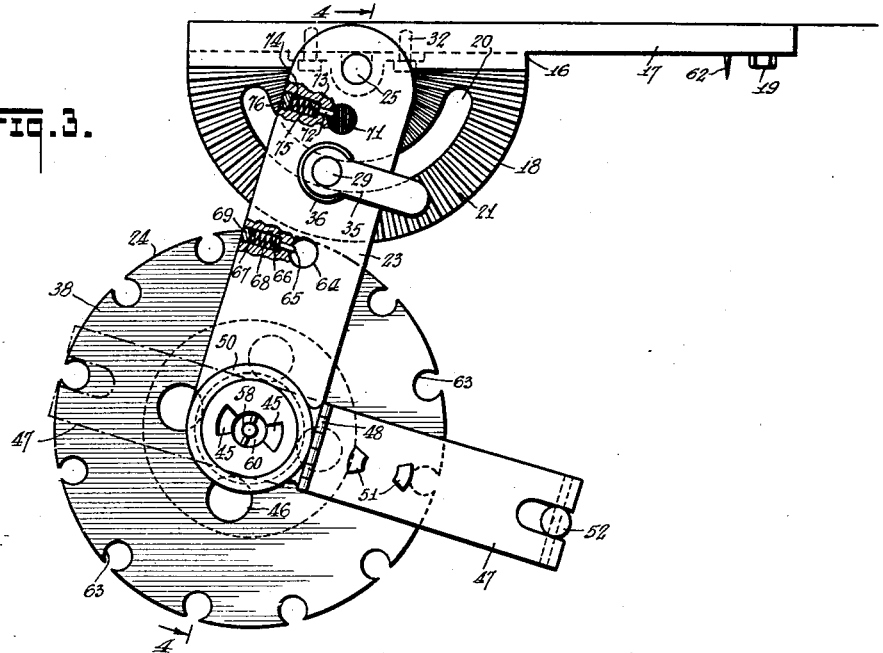
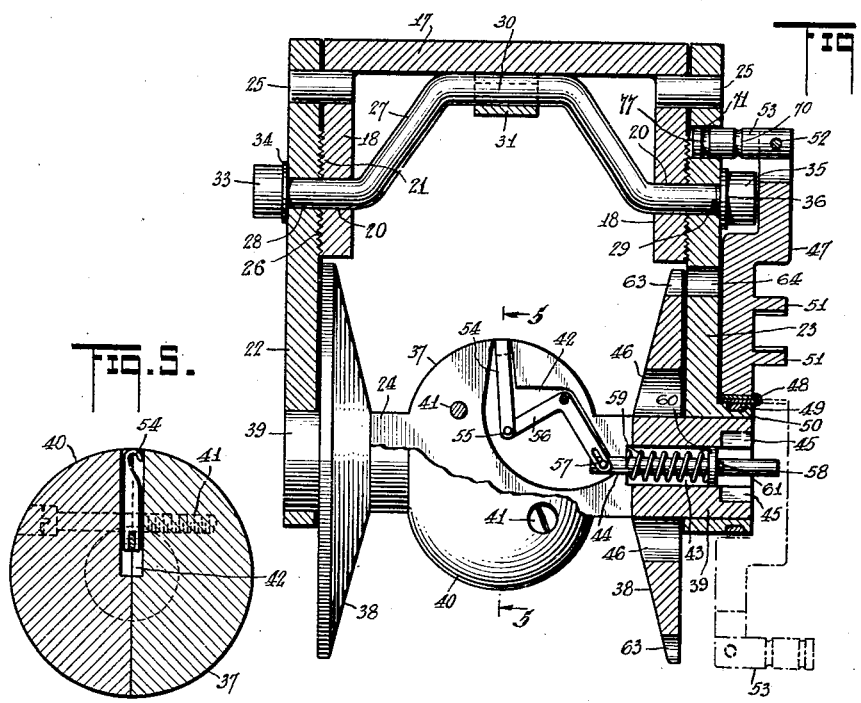
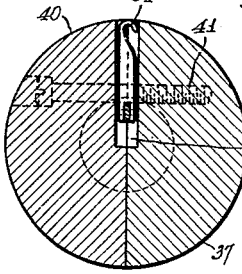
INVENTOR
C. H. Dierksmier
BY
ATTORNEY Patented Apr. 9, 1929.

1,708,755

UNITED STATES PATENT OFFICE.

CHARLES H. DIERKSMIER, OF MANOMET, MASSACHUSETTS.

ROTARY ANTISKID CHAIN FOR VEHICLE WHEELS.

Application filed May 9, 1927. Serial No. 189,994.

This invention relates to anti-skid chains for vehicle wheels, and means for applying an endless chain to a vehicle wheel, and for removing the same therefrom.

Some of the objects of the present invention are: to provide an improved means on a part of an automobile, which is adapted to carry an endless anti-skid chain disposed, so that the chain may be quickly and easily applied to one of the road wheels, and be quickly and easily removed from the road wheel; and to provide means which cooperates with a road wheel of a vehicle so that an endless anti-skid chain may be employed to encircle the road wheel and a spool, so that the chain will travel constantly when the road wheel is in motion, and thus set up a more effectual anti-skidding action.

With the foregoing and other objects in view, the invention resides in the particular combination, construction, and operation of the parts hereinafter fully described.

The nature of the invention and its distinguishing features and advantages will appear when the following specification is read in connection with the accompanying drawing, in which—

Fig. 3 is a side view of the device on an enlarged scale, illustrating certain features.

Fig. 4 is a sectional view taken substantially on the line 4—4 of Fig. 3.

Fig. 5 is a detail sectional view taken on the line 5—5 of Fig. 4.

Figure 1:
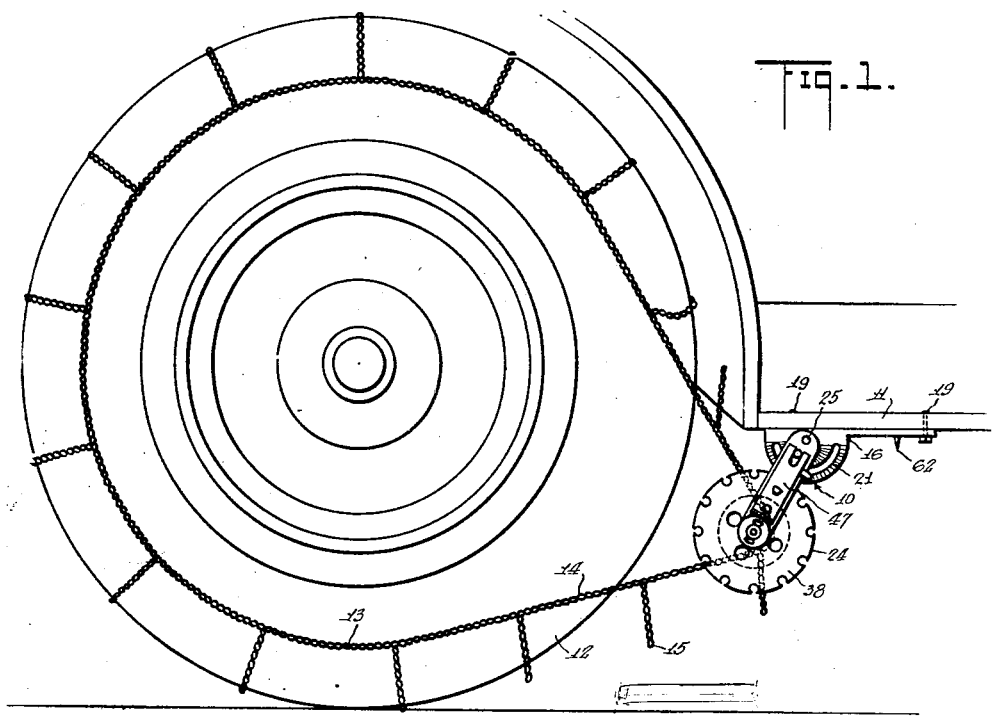
Figure 1 is a view illustrating an endless anti-skid chain in use in conjunction with one of the rear road wheels of an automobile and the device of the present invention which cooperates therewith.

Generally stated, the invention resides in the combination with an endless anti-skid chain of a device, comprising a spool which cooperates with one of the road wheels of a vehicle, and the chain, means supporting the spool for rotation, and for shifting the position of the spool with respect to the road wheel for the chain applying and removing operations, manually operable means for rotating the spool to wind the chain thereon, and means which prevents the chain from unwinding when it is wound on the spool.

Referring now more particularly to the several views of the drawing for all of the details, it will be apparent that, there is shown a device 10 secured in place on the running board 11 of an automobile in proximity to one of the rear road wheels 12 of the automobile. The said device 10 cooperates with the road wheel 12 and the chain 13 to set up an anti-skidding action. The chain 13 will be of the endless type consisting of side chain elements 14 and transverse anti-skid elements 15 connected with the elements 14. The device 10 is adapted to carry chain 13 ready to be applied to the road wheel 12 for use, and also to carry the chain 13 when not in use. The device 10 includes a fixture 16 comprising a plate 17 and spaced sectors 18. The plate 17 has holes therein for the accommodation of fastening elements such as the bolts 19 for effecting the attachment of the device to the running board 11. Each of the sectors 18 has an arcuate slot 20 and radial serrations 21. Arms 22 and 23 are employed in conjunction with the sectors 18 respectively for supporting a spool 24 for rotation, and for movement with respect to the fixture 16. Each of the arms 22 and 23 is pivotally connected as at 25 with its related sector 18. Each of the arms 22 and 23 has serrations 26 which coact with the serrations 21 of its related sector 18. A clamping rod 27 is employed. The rod 27 is of irregular formation so as to provide axially aligned ends 28 and 29, and an intermediate portion 30. The rod 27 is supported for turning movement by the use of a strap bearing member 31 attached to the under side of the plate 17 of the fixture 16, as at 32; the member 31 being employed in conjunction with the intermediate portion 30, so that the latter will be in axial alignment with the pivots 25. The ends 28 and 29 are disposed respectively through the slots 20 in the sectors 18 and also extend through holes respectively in the related arms 22 and 23. The end 28 is screw-threaded and accommodates a binding nut 33 and a spring washer 34 which bears against the arm 22. The end 29 is screw-threaded to receive a wing nut 35 which acts on a spring washer 36 surrounding said end, the washer bearing against the arm 23. It will now be understood that the arms 22 and 23 may be clamped in any desired position of adjustment with respect to the fixture 16. It is also to be observed that the serrations 21 and 26 supplement the action of the clamping rod 27 and nuts 33 and 35 to hold the arms 22 and 23 against unintentional movement.

The spool 24 comprises a core 37, disks 38, and trunnions 39. The core 37 includes a removable part 40 which is held in place by suitable fastening elements such as the screws 41. The part 40 of the core and its companion part are formed to provide a space 42 between them for a purpose to appear. The spool also has a bore 43 which opens through one of the trunnions 39 and communicates with a smaller bore 44 opened to the space 42, the purpose of which will appear. The trunnion 39 having the bore 43 therein also has keyways 45 which are arranged diametrically opposite each other, and the purpose of these keyways will also be explained. The trunnions 39 are received respectively in holes in the arms 22 and 23. In this manner the spool 24 is mounted for rotation. Each of the disks 38 of the spool has holes 46 to allow dirt to pass therethrough.

In order to cause the rotation of the spool 24 manually, there is provided a crank arm 47. One end of the crank arm 47 is hingedly connected as at 48 with a ring 49 associated with a second ring 50. The ring 50 will be essentially formed circumferentially with a groove in which the ring 49 will be disposed, and to make it possible for the association of the ring 49 with the ring 50. The ring 49 will be rotatable with respect to the ring 50. The ring 50 is carried by the arm 23 at the lower extremity. The ring 50 may be secured in any suitable manner, and in the present instance is formed on the arm 23. The ring 49 may be split so as to be sprung in place in the groove. The arm 47 has keys 51 adapted to be received respectively by the keyways 45, when the arm 47 is moved to the position shown in dot and dash lines in Fig. 4. The arm 47, at its outer end has pivotally connected therewith as at 52 a handle 53. The handle may be manipulated when the arm 47 is in its position to bring the keys 51 respectively into the keyways 45, to cause rotation of the spool 24. This turning of the spool 24 will be performed to wind the chain 13 around the core 37 of the spool.

In order to positively connect a portion of the chain 13 with the core 37 of the spool for winding the chain, there is provided in the space 42 a hook 54, the inner end of which is pivotally connected as at 55 with a bell crank lever 56 carried by one of the parts of the core 37 and also arranged in the space 42. The lever 56 has pin and slot connection as at 57 with a short rod 58 extending through the bores 43 and 44. The wall of the bore 44 serves as a guide bearing for the rod 58. A coil spring 59 surrounds the rod 58 and is arranged in the bore 43. One end of the spring 59 bears against the end wall of the bore 43, and the opposite end of the spring bears against a washer 60 arranged on the rod 58, and said washer being held against longitudinal movement in one direction by a pin 61 extending through the rod 58. The spring 59 has a normal tendency to hold the hook 54 withdrawn into the space 42, as shown in Figs. 4 and 5. However, when the arm 47 is moved to the position shown in dot and dash lines in Fig. 4 the arm will press inwardly on the rod 58 and against the action of the spring 59, and by virtue of the lever 56, the hook 54 will be moved outwardly so that the bill of the hook may be engaged around one of the anti-skid elements 15 of the chain 13. Then when the spool 24 is rotated, the chain will be wound on the core. The spool 24 may be swung in a direction away from the wheel 12, or to the right from the position shown in Fig. 1 to the position shown in Fig. 2. This will bring the outermost portion of the chain against the plate 17 of the fixture 16. Suitable pins 62 on the plate 17 will be in engagement with portions of the chain to prevent the chain end from moving.

In order to supplement the clamping action set up on the arms 22 and 23 by the clamping action of the rod 27 and the nuts 34 and 35, there is provided in the disk 38 adjacent the arm 23 openings 63 around the marginal edge. The said openings 63 are spaced equi-distantly. The arm 23 has a hole 64. At the hole 64 there is arranged a locking pin 65 having a head 66 arranged in a bore 67 in the arm 23. A spring 68 is arranged in the bore 67 and is held therein by a small plug 69. The spring 68 has a normal tendency to hold the pin 65 in a locking position, in which one end will extend into the hole 64. When the arm 47 is swung to a position to bring the hinge 48 lowermost, the handle 53 may then be entered into the hole 64 and one of the openings 63 in the disk 38. The handle 53 has a groove 70 into which the end of the pin 65 projects. In this manner the spool 24 is prevented from rotating.

When the chain has been unwound from the spool 24 and is arranged on the wheel 12, the arm 47 may be detachably held against movement, and this is accomplished by virtue of a hole 71 in the arm 23 and a locking pin 72 at the hole 71. The said locking pin 72 has a head 73 arranged in a bore 74 in the arm 23. A spring 75 is arranged in the bore 74 and is held in place by a small plug 76. The spring 75 has a normal tendency to hold the pin 72 in a locking position, in which one end of the pin projects into the hole 71. When the arm 47 is swung upwardly on the ring 50 and then over toward the arm 23, the handle 53 may be entered into the hole 71. The handle has a groove 77 into which the end of the pin 72 projects. In this manner the crank arm 47 is detachably held against movement. This will be the position of the crank arm 47 when the chain is in use.

Figure 2:
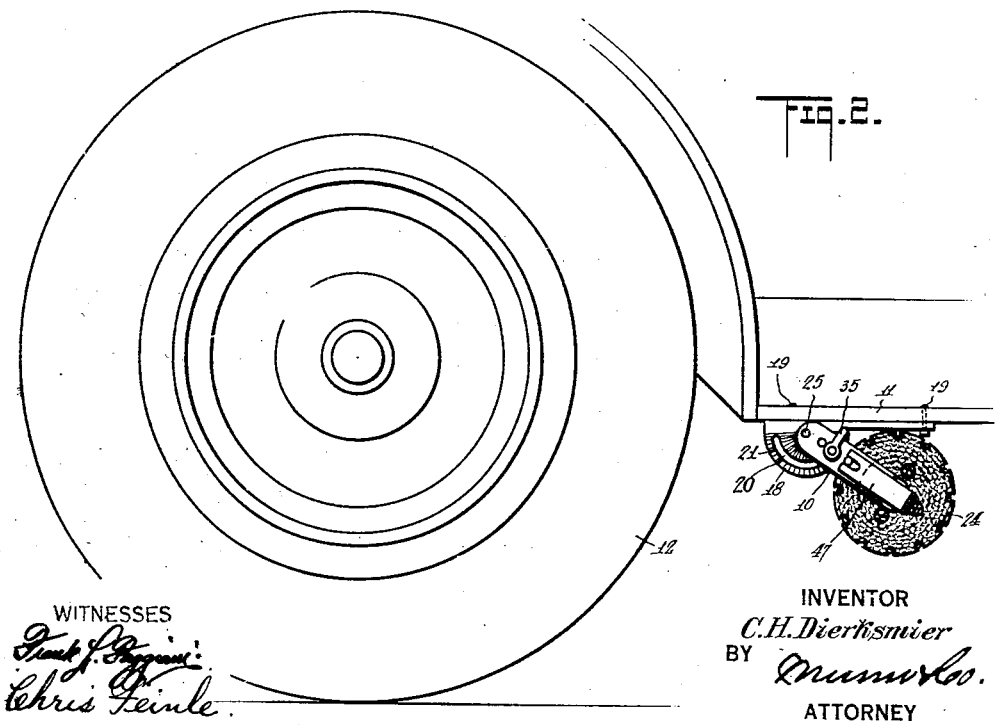
Fig. 2 is a view illustrating the chain removed from the road wheel and held on the device of the present invention ready for use.

When the chain is wound on the spool, and not in use as shown in Fig. 2, and it is desired to put the chain into use, the spool is swung toward the wheel 12 to give sufficient slack in the chain. This is accomplished by loosening the wing nut 35 followed by the swinging of the arms 22 and 23, and therefore the spool 24, with the chain wound on the spool. The clamping nut 35 may then be tightened to hold the spool 34 in its new position. The handle 53 of the crank arm 47 may then be disengaged from the pin 65, which allows the spool 24 to rotate. The chain is then brought over the top of the wheel 12, and the car is backed which will bring the chain around the wheel. The chain 13 will then encircle the wheel 12 and the spool 24. The spool 24 will then be adjusted to a position in which all of the slack in the chain will be taken up. When the automobile is in motion, the chain so disposed will be caused to travel around with the ground wheel and spool and set up an effective anti-skidding action. When it is desired to wind the chain on the spool 24 after it is no longer to be used on the wheel 12, the handle 53 of the crank arm 47 is disengaged from the locking pin 72. The crank arm 47 may then be brought to a position so that the keys 51 may be entered into the keyways 45. The spool may then be rotated to wind the chain thereon. It is to be understood, however, that the spool will have been moved toward the wheel 12 to give sufficient slack in the chain so that it may be separated from the wheel 12. The spool with the chain wound thereon may then be swung to the out of the way position as shown in Fig. 2, there being securely clamped against movement.

I claim:

1. A device for use in conjunction with an endless anti-skid chain, said device comprising a spool on which said chain is adapted to be wound and from which it is unwound, means on which said spool is mounted for rotation, a hook arranged in a space in the core of said spool, the bill of said hook adapted to engage a portion of the chain when disposed out of said space, and means for effecting the movement of the hook to bring its bill into and out of said space.

2. A device for use in conjunction with an endless anti-skid chain, said device comprising a spool on which said chain is adapted to be wound and from which it is unwound, means on which said spool is mounted for rotation, a hook arranged in a space in the core of said spool, the bill of said hook adapted to engage a portion of the chain when disposed out of said space, means for effecting the movement of the hook to bring its bill into and out of said space, and means for rotating said spool.

3. A device comprising a spool, adjustable means on which the spool is mounted for rotation, a crank arm loosely connected with the first mentioned means, said crank arm having a movable member with keys, said keys respectively adapted to enter keyways in a part of the spool, when the movable member is disposed across the axis of the spool, said movable member having a handle which serves for manipulating the crank arm to cause rotation of the spool when said keys are in said keyways, and means for detachably holding the crank arm against movement when not in use.

4. A device comprising a spool, adjustable means on which the spool is mounted for rotation, a crank arm loosely connected with the first mentioned means, said crank arm having a movable member with keys, said keys respectively adapted to enter keyways in a part of the spool, when the movable member is disposed across the axis of the spool, said movable member having a handle which serves for manipulating the arm to cause rotation of the spool when said keys are in said keyways, and means for detachably holding the crank arm against movement when not in use, said handle adapted to engage a portion of said spool to prevent said spool from rotating when said crank arm is held against movement.

5. A device for use in conjunction with an endless anti-skid chain, said device comprising a spool on which said chain is adapted to be wound and from which it is unwound, means on which said spool is mounted for rotation, chain engaging means carried by said spool, and means carried by said spool operable for moving the chain engaging means into and out of chain engaging position.

6. A device for use in conjunction with an endless anti-skid chain, said device comprising a spool on which said chain is adapted to be wound and from which it is unwound, means on which said spool is mounted for rotation, chain engaging means carried by said spool, means carried by said spool operable for moving the chain engaging means into and out of chain engaging position, and means for rotating said spool and also for operating the last mentioned means to move the chain engaging means into chain engaging position.

7. A device of the class described comprising a spool, means on which said spool is mounted for rotation, a hook, means connected with the hook carried by the spool which is operable to move the hook into and out of hooking position, and a crank for rotating the spool, said crank serving to operate the last mentioned means to move the hook into the hooking position.

CHARLES H. DIERKSMIER.